March 27, 1934. E. D. TILLYER ET AL 1,952,395
SCREW SETTING DEVICE
Filed Sept. 15, 1932 2 Sheets-Sheet 1
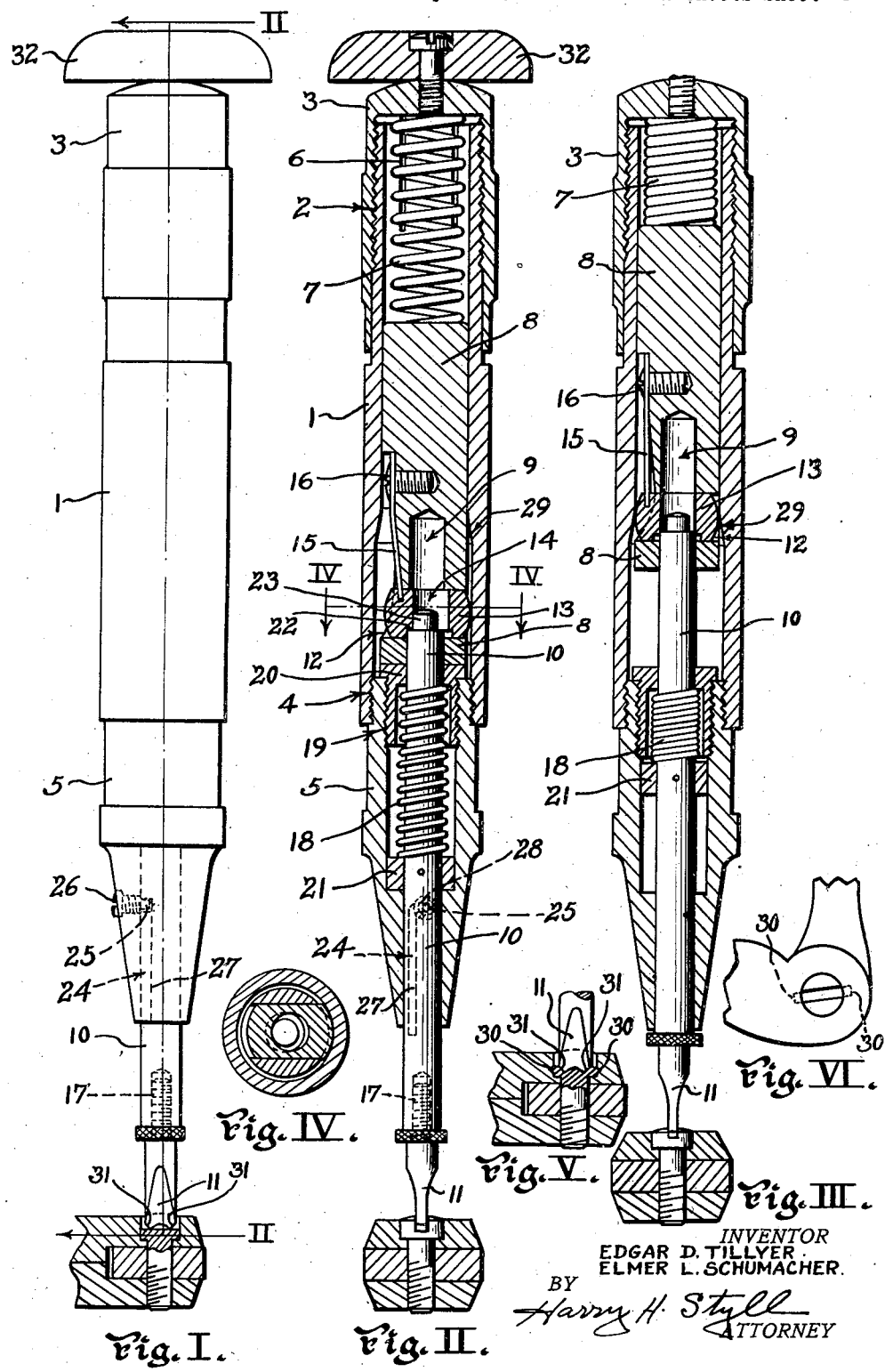
INVENTOR
EDGAR D. TILLYER
ELMER L. SCHUMACHER
BY Harry H. Styll
ATTORNEY

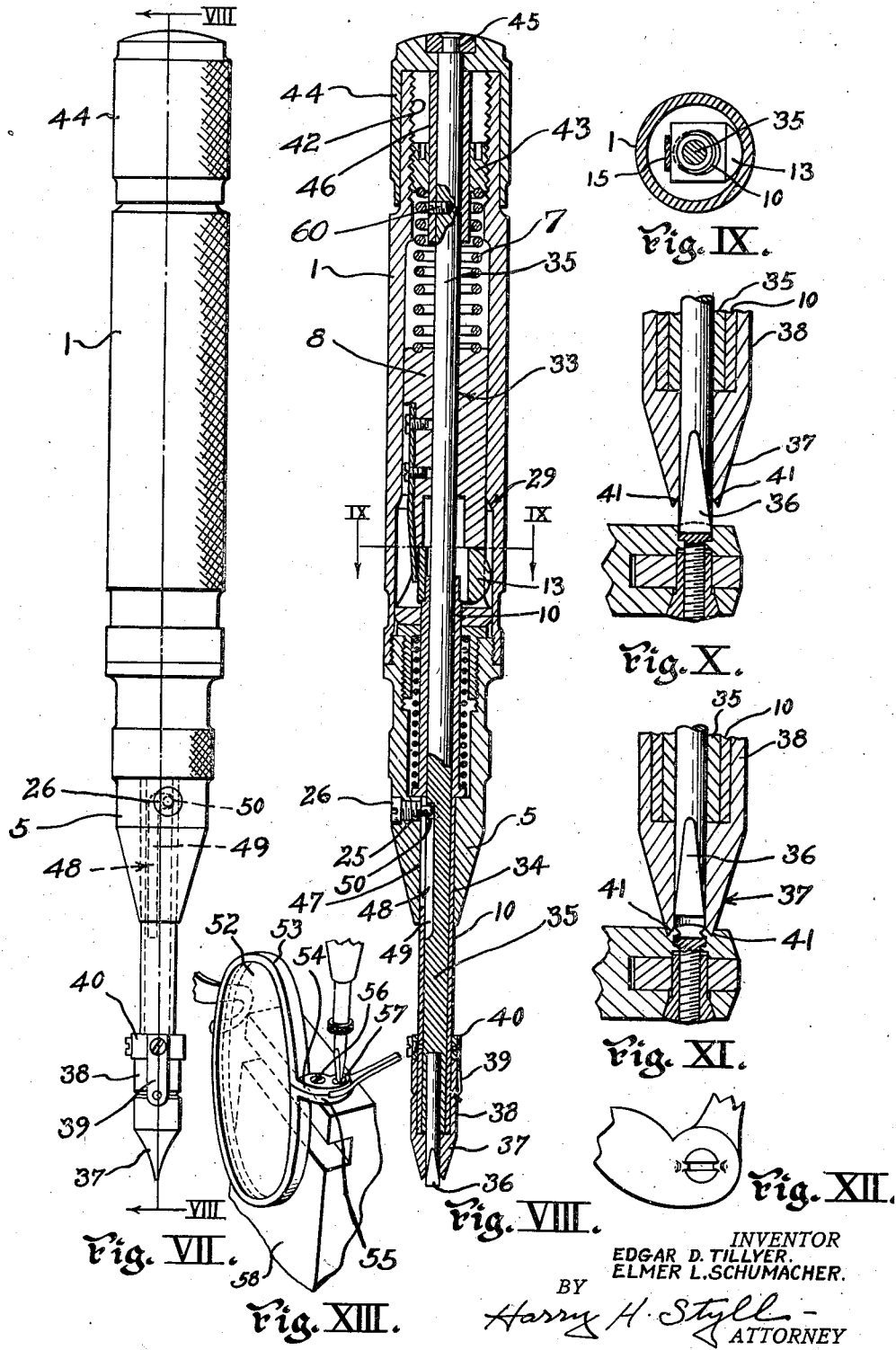

Patented Mar. 27, 1934

1,952,395

UNITED STATES PATENT OFFICE 1,952,395

SCREW SETTING DEVICE

Edgar D. Tillyer and Elmer L. Schumacher, Southbridge, Mass., assignors to American Optical Company, Southbridge, Mass., a voluntary association of Massachusetts Application September 15, 1932, Serial No. 633,294

3 Claims. (Cl. 81—10)

This invention relates to improvements in connecting or securing means and has particular reference to improved methods and means of tightening and locking the parts thereof.

One of the principal objects of the invention is to provide improved means and methods of tightening and locking the parts of connecting or securing means and relates particularly to an improved tool for use in tightening and locking the parts of the connecting or securing means of an ophthalmic mounting such as are applied to the lens rims, lens straps, temples and endpieces, etc., and to devices embodying similar characteristics in other arts.

Another object of the invention is to provide a combined screw driver and swaging tool for tightening and locking screws to the means to which they are attached.

Another object is to provide an improved tool by means of which a portion of the head of a screw may be struck up into the means to which it is attached to lock the same to said means.

Another object is to provide an improved method of securing two or more members together by means of a screw and for tightening and locking the said screw against loosening when said members are in secured relation with each other.

Another object is to provide an improved method of tightening and locking the screw in a temple or lens rim connection of an ophthalmic mounting so that the said screw will not become loose during the use of the mounting.

Another object is to provide an interchangeable tool point for a device of the character described.

Another object is to provide an improved tool by means of which a portion of the means to which the screw is attached may be struck into the kerf of the screw to lock the same against backing out and loosening after it has been tightened.

Another object is to provide a combined screw tightening and locking tool which will perform both of its functions without having to remove the tool from the screw.

Another object is to provide a more positive, durable and simplified method of setting screws after they have been tightened and improved means by which the setting operation may be performed quickly and accurately.

Other objects and advantages of the invention will become apparent from the following description taken in connection with the accompanying drawings and it will be apparent that many changes may be made in the details of construction, arrangements of parts and methods shown and described without departing from the spirit of the invention as expressed in the accompanying claims, we, therefore, do not wish to be limited to the details of construction, arrangements of parts and methods shown as the preferred forms only have been shown by way of illustration.

It will also be apparent that the improved methods and means may have many uses and applications to other arts than the one specifically described herein and all of which are embodied in this invention.

Referring to the drawings:

Fig. I is a side elevation of the device embodying the invention;

Fig. II is a longitudinal sectional view taken on line II—II of Fig. I;

Fig. III is a view similar to Fig. II showing the position of the parts at the instant the hammer-blow is to be delivered, the swaging tool being retracted and springs compressed;

Fig. IV is a sectional view taken on line IV—IV of Fig. II;

Fig. V is a fragmentary sectional view showing the position of the swaging tool and parts after the hammer-blow is struck;

Fig. VI is a plan view of the connection in Fig. V with the tool removed;

Fig. VII is a side elevation of a modified form of the invention;

Fig. VIII is a sectional view taken on line VIII—VIII of Fig. VII;

Fig. IX is a sectional view taken on line IX—IX of Fig. VIII;

Fig. X is a fragmentary sectional view showing the position of the parts during the screw tightening operation;

Fig. XI is a view similar to Fig. X showing the position of the parts and swaging tool after the hammer-blow is struck;

Fig. XII is a plan view of the connection in Fig. XI, showing the tool removed.

Fig. XIII is a fragmentary perspective view illustrating the use of the device shown in Figures I to III inclusive in tightening the temple and rim connections of an ophthalmic mounting.

Much difficulty has been encountered in the past in having the screw of a screw connection back out and become loose or disconnected during its use. This defect was not only inconvenient and annoying but in many instances in the past caused the parts to move out of aligned relation with each other or become disconnected and lost, rendering such devices unusable and such connections undesirable and impractical.

The prime object therefore of applicants' invention is to provide positive and durable means for preventing the possible backing out and loosening of screws during their use.

Referring more particularly to the drawings wherein similar reference characters denote corresponding parts throughout the several views, the device embodying the invention as shown in Figures I to V inclusive comprises a hollow cylindrical casing or housing portion 1 threaded externally at 2 adjacent one end to receive the cap 3 and internally threaded at 4 adjacent the opposite end to receive the tip portion 5. The casing or housing 1 adjacent the threaded end 2 is of a slightly reduced external diameter and is provided with a plurality of longitudinal slots 6 giving a slight elastic action when the cap 3 is moved on the threads 2. The cap 3 is adapted to adjust the tension of an inclosed hammer spring 7 which bears against a hammer member 8 movably located within the casing or housing 1.

The hammer member 8 has an axial perforation 9 adapted to receive the end of the butt 10 and a transverse perforation 12, in which is located an operating stud 13. This stud 13 is centrally perforated at 14 to permit the butt 10 to work through it at the proper time and has an overall length about equal to the diameter of the hammer 8 and normally protrudes slightly at one end under the influence of a flat spring 15, secured by a screw 16 to an obliquely flattened side of the hammer as shown in Fig. II. The free end of the spring 15 engages in a slot in the side of stud 13 near its end, so that they move together.

The tool 11 is threadedly attached at 17 to the butt 10 so that it may be replaced if it becomes bent or broken.

The tip portion 5 is formed hollow and incloses the butt recoil spring 18 and part of the reciprocating butt 10, which works through it. The tip 5 is threaded internally at 19 to receive the hollow bushing 20. The said bushing is adapted to hold the spring 18 under proper compression against the collar 21 on the butt. The bushing 20 is axially perforated to guide the butt 10 in its reciprocation. The collar 21 is held in place on the butt frictionally, by a shoulder, or by a pin or like means and any desired tension can be imparted to the spring 18 by screwing in the bushing 20 more or less.

The butt 10 of the tool 11 protrudes normally through the bushing 20 and is formed with a shoulder 22 and a reduced terminal projection 23, which readily enter the axial perforation 9 in the hammer member 8. The said butt, intermediate its ends, is provided with a bayonet slot 24 into which the reduced end 25 of a screw 26 threaded in the portion 5 extends. The major portion 27 of the slot 24 extends longitudinally of the butt 10 and the relatively short portion 28 of said slot extends transversely of the butt adjacent the reduced end 25. When the said tool 11 is used as a screw driver and is turned in the direction of tightening the screw, the transverse portion 28 which normally is in aligned relation with the reduced end 25, is adapted to receive said end and cause the same to interlock with the butt 10 and prevent longitudinal movement of said butt in the members 1 and 5. This allows a pressure to be imparted to the tool during the tightening of the screw in the work 29, as illustrated in Figures I and II.

When the tool 11 is used as a swaging tool, as shown in Figures III and V, the members 1 and 5 are rotated in a direction counter-clockwise or opposite that of tightening the screw until the reduced end 25 is aligned with the longitudinal portion 27 of the slot. This permits sliding movement of the butt 10 in the members 1 and 5 and allows the said members to be pressed downwardly on said butt. When the tool 11 is pressed against the work to be swaged, the butt 10 recedes largely into the tip portion 5, the shoulder 22 of the butt 10 bearing against the side of the operating stud 13 adjacent to the perforation 14 in said stud, see Fig. II. The rearward movement of the butt 10 carries the hammer 8 backward in the member 1, as seen in Fig. III, compressing the hammer spring 7 and recoil spring 18.

The inner wall of the member 1 has at the proper point a tapering cam portion 29, where its bore is quickly reduced so that when the butt and hammer recede the projecting convex head of the operating stud 13 bears against this tapering cam portion and is moved longitudinally, as illustrated in Fig. III, just enough to bring its perforation into the exact axial plane of the butt 10. This dislodges the stud from its rest on the shoulder 22 of the butt, depriving the stud of its support it previously had and permitting it to yield to the pressure of the spring 7. It instantly advances, striking the desired blow upon the end 23 of the butt 10 which it surrounds, forcing the point of the tool 11 into the screw kerf and causing a portion of the wall thereof to be struck outwardly into the work as shown at 30 in Fig. V. The end of the tool 11 is reduced in thickness to fit in the kerf of the screw and has slightly angled portions 31 adjacent the ends of its reduced edge and a slightly grooved portion intermediate said angled portions. The said angle portions 31 are adapted to deflect a portion of the wall of the kerf of the screw outwardly, as shown in Figures V and VI, into the body portion of the means to which the screw is attached. These outwardly struck portions 30 form lock means for preventing turning and loosening of the screw during its use.

The cap 3 is provided with a rotatable turn button 32 which is adapted to rest in the palm of the hand and permit free rotary movement of the tool during the tightening of the screw.

The device is used in a manner similar to that of a screw driver. The blade of the tool 11 is placed in the kerf of the screw. The housing 1 and tip portion 5 are then turned in the direction of tightening the screw. The first slight turn of said members 1 and 5 causes the reduced end 25 of the screw 26 to interlock with the transverse portion 28 of the bayonet slot and prevent longitudinal movement of the butt during the tightening of the screw. A slight turn of the members 1 and 5 counter-clockwise after the screw is tightened unlocks the pin 25 and transverse portion 28 and permits movement of said members longitudinally of the butt 10. Still holding the tool 11 in the kerf of the screw the device is pressed, as illustrated in Fig. II. The stud 13 engaging the cam portion 29 releases the interior hammer mechanism and the hammer 8 pounds the blade end of the tool 11 against the kerf of the screw with sufficient force to swage a portion of the wall of said kerf outwardly and lock the screw in place. The tightening and locking operations are accomplished quickly and easily and are performed successively without removing the tool 11 from the screw. The force of the blow of the hammer 8 may be regulated by adjusting the spring members 7 and 18 to the proper tension as previously set forth.

The general structural details and operation of the modified device shown in Figures VII and VIII are substantially the same as the device described and shown in Figures I to III inclusive except that the hammer member 8 and butt portion 10 are provided with longitudinal perforations 33 and 34 centrally thereof through which a separate screw driver support 35 is rotatable. The screw driver support 35 is provided with an interchangeable screw driver tip portion 36 which extends through a central opening in an interchangeable swaging tool 37. The swaging tool 37 is formed with a grooved cap portion 38 which fits over the end of the butt 10 and is held thereon by a spring clip 39 mounted on a collar 40 attached to the butt. The swaging tool in this instance is provided with tapered projections 41 which are adapted to span the screw head and strike portions of the article to which the screw is attached into the kerf of the screw as shown in Figures XI and XII.

The hollow housing or casing 1 in this instance is provided with an internally threaded bore 42 adjacent its end opposite the swaging tool in which is threaded a cap screw 43 for regulating the tension of the hammer spring 7. A rotatable cap member 44 is fitted over the end of the member 1 adjacent the cap screw 43 and is loosely pivoted at 45 to the end of the screw driver support 35. A sleeve 46 attached to the end of the support 35 by a screw member 60 and extending through an opening in the cap screw 43 forms a bearing for the cap end of the screw driver support 35.

The reduced end 25 of the screw 26 in this instance extends through a slot 47 in the butt 10 into a bayonet slot 48 in the screw driver support 35. The said slot 48 is provided with a longitudinal portion 49 and a transverse portion 50.

The method of operation of this device is similar to that shown in Figures I to III inclusive. The screw driver tip 36 is placed in the kerf of the screw, as shown in Fig. X. The housing or casing 1 and portion 5 are then turned in the direction of tightening the screw. The first slight turn of the members 1 and 5 causes the reduced end 25 of the screw 26 to interlock with the transverse portion 50 and prevent longitudinal movement of the screw driver during the tightening of the screw. A slight turn of the members 1 and 5 counter-clockwise or in a direction opposite that of tightening the screw after the said screw has been tightened unlocks the pin 25 and transverse portion 50 and allows the members 1 and 5 to move longitudinally of the butt 10 and screw driver support 35. This allows the swaging tool 37 to be pressed into engagement with the article ready to receive the blow of the hammer 8 when the cam taper 29 in the casing or housing 1 causes the stud 13 to move transversely and disengage with the shouldered end of the butt 10 and allow the spring 7 to force the hammer 8 downwardly against the end of said butt. As previously stated above this causes a portion of the article to be struck into each end of the kerf of the screw and lock the same against turning, as shown in Figures XI and XII.

The devices described above are adapted particularly for use in securing the screw in the screw connections of lens rims, temple connections, lens straps, etc., of ophthalmic mountings, and is adapted to prevent loosening thereof during the use of said mountings. It is to be understood however that the devices and methods shown and described may have many uses in other arts and all of which are embodied in this invention.

The connection as shown in the drawings is made by forming a threaded recess and a counterbore in the mouth of said recess, placing a screw in the threaded recess with the head thereof extending into the counterbore, and striking a portion of the wall of the kerf of the screw outwardly into the wall of the counterbore or a portion of the wall of the counterbore into the kerf of the screw to lock the same against loosening. The counterbore may be omitted if desired and the screw may be of a headless type with a kerf in the end thereof. In this instance the kerf is threaded internally of the threaded recess and locked therein by striking a portion of the wall of the kerf into the wall of the recess or by striking a portion of the wall of the recessed portion internally of the ends of the kerf. The arrangement in Figures X and XI shows a taper headed tubular member extending through aligned openings in the members which are to be connected. The tubular member has a threaded bore into which the threaded shank of the screw extends. One of the connecting members in this instance has a tapered opening adapted to interlock with the tapered head of the tube and the other a counterbore adapted to receive the head of the screw. The head of the screw is adapted to be locked in said counterbore in a manner similar to that described in the above connections after the said screw has been tightened.

Fig. XIII illustrates the method of tightening and locking the split ends of a lens rim and the temple connection of an ophthalmic mounting. The lens 52 is first placed in the groove of the split lens rim 53 and the endpieces 54 and 55 are drawn together. The connecting screw 56 is placed in the usual openings in the endpieces and is tightened by the use of the tool embodying the invention until the rim 53 is tight on the lens. A portion of the screw head is then swaged into interlocked relation with the endpiece and provides positive means for preventing the loosening of the screw during its use. The temple connecting screw 57 is tightened and locked in the same manner. The endpiece, during the swaging operation, may be supported by the hand or placed on a block such as illustrated at 58. This method of tightening and locking the connecting screws prevents their working out and becoming loose during the use of the mounting and obviates the past defect of having the lenses move out of their prescribed position before the eyes and the commonly known drop temple defect or that defect wherein the temples become loose and do not properly support the mounting on the face.

From the foregoing description it will be seen that we have provided an improved tool and method of tightening and locking a threaded device against withdrawal during its use.

Having described our invention we claim:

1. A screw tightening and locking device comprising a housing having a spring pressed hammer member internally thereof, a longitudinally movable tool in aligned relation with the hammer member and having a screw driver and swaging point at its outer end, means for locking the tool against longitudinal movement in the housing when the said housing is turned in the direction of tightening the screw as a screw driver, said lock means being adapted to release the tool to permit longitudinal movement thereof in the housing by a slight turn of the housing in a direction opposite that of tightening the screw, means to compress the spring when the tool is pressed inwardly of the housing by pressure on the work, and trip means to release the hammer to drive the tool outwardly when the tool is moved a given amount inwardly of the housing to force the swaging point to displace a portion of the work.

2. In a device of the character described, a hollow tool holder, a rod like tool member mounted in the holder for longitudinal movement therein, a hammer member in the holder beyond the tool member and mounted for longitudinal movement in the holder; spring means in the holder adapted to urge the hammer member when compressed against the tool member, trip means for releasing the hammer when the tool member has been pushed toward the hammer a fixed distance by pressing the tool on the work and means associated with the tool and holder to prevent longitudinal movement of the tool when said means are in one position and to permit said movement when the parts are moved to another position.

3. In a device of the character described, a hollow tool holder, a rod like tool member mounted in the holder for longitudinal movement therein, said tool having a swaging point and a screw driver end associated therewith and a longitudinal slot therein with an offset reentrant channel portion, a pin in the holder projecting into the slot, the tool being free for longitudinal movement in the holder when the pin is in the longitudinal slot and held against said movement when the pin is in the reentrant channel so that the said tool may be used as a screw driver when the pin is in the reentrant channel and as a spring driven swager when the pin is in the longitudinal slot, a hammer member in the holder beyond the tool member and mounted for longitudinal movement in the holder, spring means in the holder adapted when compressed to urge the hammer member against the tool member and trip means for releasing the hammer when the tool member has been pushed toward the hammer a fixed distance by pressing the tool on the work.

EDGAR D. TILLYER.
ELMER L. SCHUMACHER.